United States Patent
Peltier

(10) Patent No.: US 6,843,204 B2
(45) Date of Patent: Jan. 18, 2005

(54) SQUIRREL-PROOF BIRD FEEDER FOR CLINGING TYPE BIRDS

(76) Inventor: James Patrick Peltier, 11848 Curwood Dr., Grand Blanc, MI (US) 48439

( * ) Notice: Subject to any disclaimer, the term of this patent is extended or adjusted under 35 U.S.C. 154(b) by 0 days.

(21) Appl. No.: 10/413,072

(22) Filed: Apr. 14, 2003

(65) Prior Publication Data
US 2004/0216683 A1 Nov. 4, 2004

(51) Int. Cl.[7] ................................................ A01K 39/01
(52) U.S. Cl. ...................................................... 119/57.8
(58) Field of Search ............................... 119/52.2, 52.3, 119/57.8, 57.9

(56) References Cited

U.S. PATENT DOCUMENTS 3,399,650 A * 9/1968 Goodman ................ 119/51.03
5,722,344 A * 3/1998 Rank .......................... 119/57.8
5,758,596 A * 6/1998 Loiselle ...................... 119/52.2
5,927,231 A * 7/1999 Bloedorn .................... 119/52.2

FOREIGN PATENT DOCUMENTS

GB          2154416 A * 9/1985 .......... A01K/39/01

* cited by examiner

Primary Examiner—Robert P. Swiatek

(57) ABSTRACT

A bird feeder of elongated square shape, hung by a wire and is impervious to the invasion and destruction by squirrels. The feeder relies on a slippery hard vinyl (PVC) surface that holds seed that can be plucked through a screen from the underside of the feeder-utilizing a vertical dowel for a perch. The feeder, which is weather proof, is simple to make and has no movable parts. The bird feeder caters to the clinging type birds and needs little to no maintenance and has an aesthetic appearance.

1 Claim, 2 Drawing Sheets

US 6,843,204 B2

SQUIRREL-PROOF BIRD FEEDER FOR CLINGING TYPE BIRDS

FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF INVENTION

1. Field of Invention

This invention relates to a hanging bird feeder that caters to clinging type birds that feed off dry bird seed while eliminating any access or destruction by squirrels.

2. Description of Related Art

This invention is the ultimate of squirrel proof bird feeders and yet is simply made and maintained and pleasing to the eye. Other patents such as in U.S. Pat. No. 4,523,546 Latham, has a flexible covering above feeder. In U.S. Pat. No. 5,293,835 Shagoury, has baffles above and below feeder. In U.S. Pat. No. 5,309,867 Cruz, has a weighted gate plate. U.S. Pat. No. 5,375,558 Drakos, utilizes counter weights. U.S. Pat. No. 6,321,686 Gels, has small feeder openings. U.S. Pat. No. 6,325,019 Tabor, uses slippery panels with an outer guard protecting food container with tubular supports.

While all these prior art bird feeders have different features for protecting the feeders from the marauding squirrels, most have large, bulky, expensive, unsightly and complicated construction. None of these devices completely solve the problems from the marauding and destructive squirrels while keeping the seed protected from the weather elements in an economical way with simplified construction using pre-manufactured parts as the squirrel proof bird feeder that this present invention demonstrates.

SUMMARY OF INVENTION

This present invention allows the clinging type birds to feed while eliminating access for squirrels to feed and destroy the bird feeder. It is a simple and economically constructed bird feeder of pre-manufactured parts with minor alterations that has no moving parts.

It is the object of this invention to be long enough so that a squirrel can not hang down from the cap to reach the seed.

It is the object of this invention to be weather proof from snow, rain, wind or ice.

It is the object of this invention to be simple to make with no moving parts.

It is the object of this invention to be destructive proof from the squirrels.

It is the object of this invention to be aesthetically and architecturally pleasing to the eye.

It is the object of this invention to be easily disassembled for cleaning if necessary.

DETAILED DESCRIPTION OF THE INVENTION

FIGS. 1,2,3,4 and 5 show the invention at different angles.

Figure 1:
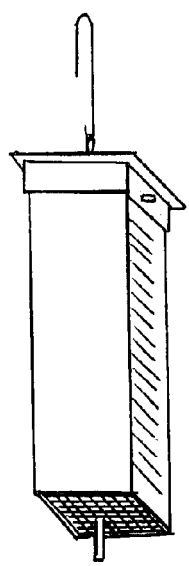
FIG. 1 is a perspective view of the bird feeder in an elevated position so that the entire bird feeder with the feeding area exposed can be appreciated.
Figure 2:
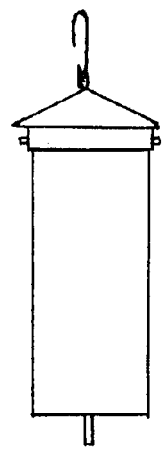
FIG. 2 is a frontal view of the bird feeder. Back view is the same.
Figure 3:
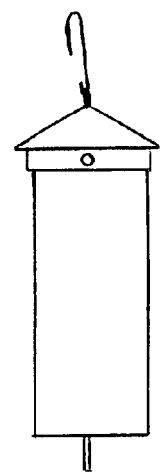
FIG. 3 is a side view of the bird feeder. Opposite side is the same.
Figure 5:
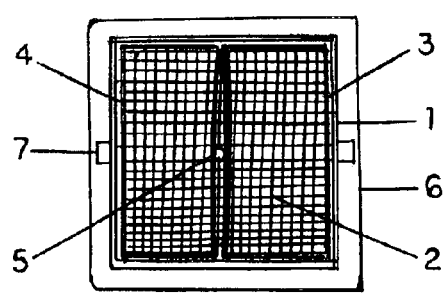
FIG. 5 is a larger view from the bottom of the bird feeder so that the feeding area can be appreciated.
Figure 4:
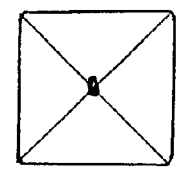
FIG. 4 is the view from the top of the bird feeder.

FIG. 5 shows the bottom of the feeder which is the main feature of this invention by pointing out the various parts-of the feeding area. It shows the screen 2 holding the right chamber 3 and the left chamber 4 in place with the dowel 5 separating the two chambers (3 & 4) by pushing them against the inner walls of the main body 1 which is attached to the cap 6 and secured in place with a dowel 7.

Figure 6:
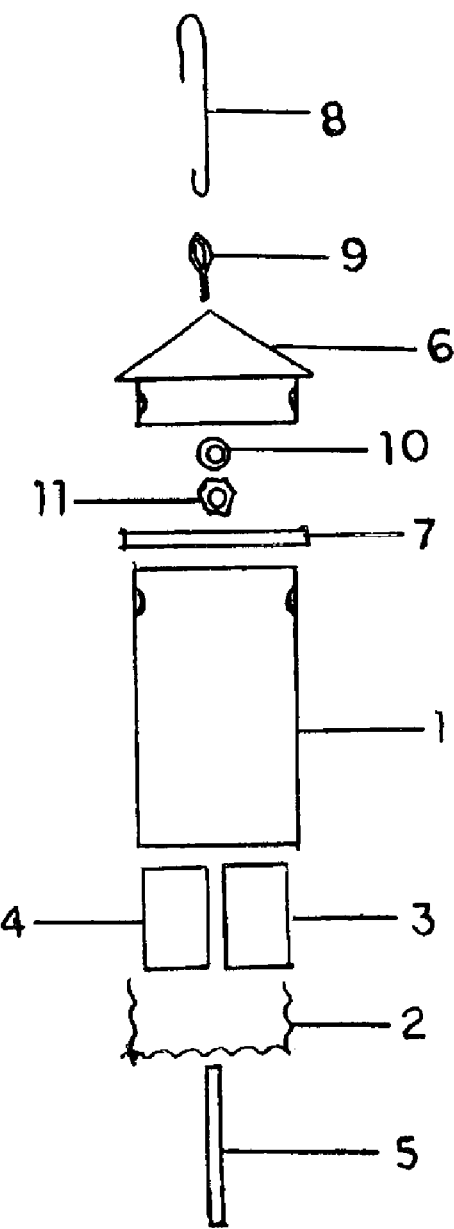
FIG. 6 illustrates the exploded view of all the parts of the bird feeder.

FIG. 6 is an exploded view of the bird feeder illustrating all the parts for assembly. The main body 1 is made of polyvinylchloride (PVC) that has a slippery surface and is 4"×4"×15" long. A screen 2 that is ¼" hardware cloth is cut to 4"×10" long and formed around the bottoms of the right chamber 3 and the left chamber 4 proportionally and is pushed, screen 2 first, down through the top of the main body 1 to within ¼" of the bottom of the main body 1. Both right 3 & left 4 chambers are also PVC and are 2"×4"×4" long each. A ⅛"×8" long wood dowel 5 is then wedged down through the top of the main body 1 between the right chamber 3 and the left chamber 4 and through the screen 2 by 2". The cap 6 is also PVC and is an external type 4"×4"×1 ¼" flange and is drilled through the top center with a 3/16" drill. A 3/16" screw eye 9 is threaded through the top of the cap 6 and secured with a 3/16" rubber coated washer 10 and a 3/16" nut 11. The cap 6 is then positioned in place on the main body 1 and a 5/16" hole drilled through both the right side and the left side of the cap 6 and main body 1 with the holes centered in the flange of the cap 6. The cap 6 is then secured to the main body with a 5/16"×4¾" long wood dowel 7 that is pushed through the drilled holes. The entire bird feeder assembly is then hung by a 12 gauge wire 8 cut 18" long and bent in a small loop on one end to hook to the screw eye 9 and bent into a bigger loop on the other end to hook to a tree limb.

It is appreciated the details of the specific embodiment illustrated herein are illustrative of the invention and are not intended to impose a restriction upon the scope of the claims to which the invention is otherwise entitled.

I claim:

1. A bird feeder that allows clinging type birds to feed while preventing squirrels from marauding or causing damage to the feeder, wherein the feeder comprises:

(a) a seed holding container comprising four walls, said container having a square transverse cross section and said walls being made of polyvinylchloride that is slippery to feel, said walls having a longitudinal extent that is consistent in length on all four sides;

(b) two chambers made of polyvinylchloride and fitting side by side within said container;

(c) a screen enveloping the bottom and sides of said two chambers for holding the seed in place;

(d) a dowel separating said two chambers and pushing them snugly against the interior of said seed holding container, wherein said dowel is extended transversely through said screen to be used as a perch;

(e) a cap fitting on top of said container, said cap being held in place by a second dowel extending through said cap and said container, said cap being made of polyvinylchloride and having an eye hook in its top center for hanging purposes, said cap being removable to fill said feeder.

\* \* \* \* \*